United States Patent Office 3,539,588
Patented Nov. 10, 1970

3,539,588
TRANS-1,4,4a,5,6,11b-HEXAHYDRO-11H-BENZO[a]
CARBAZOL-5-ONE, THIOSEMICARBAZONES
Stephen I. Sallay, Wynnewood, Pa., assignor to American
Home Products Corporation, New York, N.Y., a corporation of Delaware
No Drawing. Filed Dec. 6, 1967, Ser. No. 688,344
Int. Cl. C07d 27/68
U.S. Cl. 260—315       11 Claims

ABSTRACT OF THE DISCLOSURE

The invention is directed to novel hexahydro-11H-benzo[a]carbazol-5-one, thiosemicarbazones which may be prepared by reacting hexahydro-11H-benzo[a]carbazol-5-ones with thiosemicarbazides. The resultant products have therapeutic activity as antagonists of Influenza NWS and Herpes simplex viruses.

---

This invention relates to new chemical compounds. More particularly, it relates to novel hexahydro-benzo[a]-carbazol-5-one, thiosemicarbazones. The new compounds encompassed within the present invention are those defined by the formula:

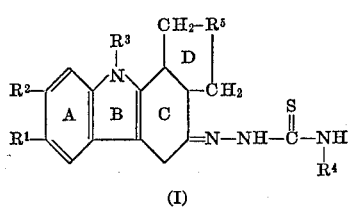

(I)

where:

$R^1$ and $R^2$, when taken separately, are the same or different members selected from the class consisting of hydrogen, lower alkyl and lower alkoxy, and $R^1$ and $R^2$, when taken together, are —O—$CH_2$—O—;

$R^3$ is a member selected from the class consisting of hydrogen, methyl, ethyl and lower alkyl substituted phenalkyl;

$R^4$ is a member selected from the class consisting of hydrogen and adamantyl; and $R^5$ is a member selected from the class consisting of vinylene (—CH=CH—), ethylene (—$CH_2$—$CH_2$) and epoxyethylene

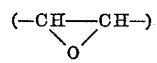

As used herein the terms "lower alkyl," "lower alkoxy," and the like, refer to groups having one to about five carbon atoms.

Typically, the reaction may be carried out as follows where a tetracyclic indole ketone is reacted with a thiosemicarbazide or a substituted thiosemicarbazide as follows:

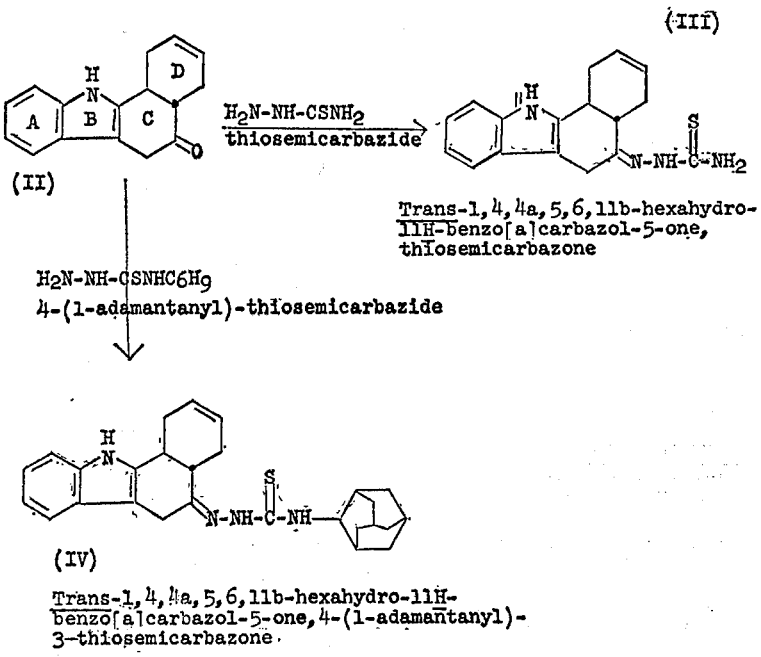

The junction of ring C and ring D in the product compounds is trans.

The preparation of compound II and similar compounds is described in United States Pat. No. 3,329,686, issued July 4, 1967. The preparation of adamantanyl thiosemicarbazide is described in patent application Ser. No. 587,985, filed Oct. 20, 1966, and entitled "Antiviral Compounds," now U.S. Pat. 3,406,180. Other starting compounds may be prepared as described in R. S. McElhinney, J. Chem. Soc., 950–955 (1966). To prepare the new compounds of the present invention, the trans form of a selected hexahydro-benzo-carbazolone is dissolved in lower alkanol, and thiosemicarbazide or its lower alkyl derivative is added. The mixture is heated at a temperature range of about 60° to about 100° C., preferably at the reflux temperature, for a period of about thirty minutes to about five hours. When the reaction is complete, the crystalline product precipitates and may be recovered by well-known techniques. For instance, the product may be recrystallized from a mixture of alkyl ketone and liquid hydrocarbon solvent, such as acetone or methylethylketone and hexane or benzene.

In accord with the present invention, the new and novel hexahydro-benzocarbazolone thiosemicarbazones have been found to possess interesting pharmaceutical properties which render them useful as synthetic medicinals. More particularly the compounds, in standard pharmacological tests, have exhibited activity against Herpes simplex and Influenza NWS viruses in mice.

In order more clearly to disclose the nature of the present invention, specific examples of the practice of the invention are hereinafter given. It should be understood, however, that this is done solely by way of example and is intended neither to delinate the scope of the invention nor limit the ambit of the appended claims.

EXAMPLE I

The following example illustrates the preparation of trans - 1,4,4a,5,6,11b - hexahydro - 11H - benzo[a]carbazol-5-one, thiosemicarbazone.

To a solution of 2.37 g. (0.01 mole) of 1,4,4a,5,6,11b-hexahydro-11H-benzo[a]carbazol-5-one in 50 milliliters (ml.) of methanol is added 1.1 g. of thiosemicarbazide. The reaction mixture is refluxed for 30 minutes, and 1.7 g. of separated crystals are collected having a melting point of 217–218° C. The crude product is recrystallized from methyl ethylketone and hexane, and decomposes at 223–225° C. The product is identified as trans-1,4,4a,5,6,11b-hexahydro-11H-benzo[a]carbazol-5-one, thiosemicarbazone.

Based on the formula $C_{17}H_{18}N_4S$, it is calculated that the elemental analysis for the product would be 65.77 percent carbon, 5.84 percent hydrogen, and 10.32 percent sulfur. The product is analysed, and the elemental content is found to be 65.87 percent carbon, 5.67 percent hydrogen, and 9.9 percent sulfur. The foregoing may be expressed:

*Analysis.*—Calcd. for $C_{17}H_{18}N_4S$ (percent): C, 65.77; H, 5.84; S, 10.32. Found (percent): C, 65.87; H, 5.67; S, 9.9.

Following the procedure of Example I and substituting each of the starting materials listed below for 1,4,4a,5,6, 11b-hexahydro-11H-benzo[a]carbazol-5 - one, results in the product listed opposite it.

One equivalent amount of 1,4,4a,5,6,11b-hexahydro-11H-benzo[a]carbazol-5-one is dissolved in dimsylsodium (prepared from one equivalent of sodium hydride in dimethyl sulfoxide at 70° C.) between about 20 to 40° C. and stirred for one hour. Then 1.1 mole equivalents of ethyl iodide is added to the reaction mixture which is stirred overnight between about 20–40° C. The reaction mixture is decomposed by ice water, and the product is extracted by hexane. The product is trans-11-ethyl-1,4, 4a,5,6,11b - hexahydro-11H-benzo[a]carbazol-5-one and is recovered by well known procedures. The product is converted to the corresponding thiosemicarbazone by following the procedure of Example I.

Following the procedure of Example III and substituting each of the starting materials listed below for ethyl iodide, results in the product listed opposite it.

Starting material:      Product

A. Benzylbromide —— Trans - 11-benzyl-1,4,4a,5, 6,11b - hexahydro - 11H-benzo[a]carbazol - 5-one, thiosemicarbazone.

B. p-Methylbenzylbromide — Trans - 1,4,4a,5,6,11b-hexahydro - 11 - p-methylbenzyl - 11H - benzo[a]-carbazol - 5 - one, thiosemicarbazone.

C. p-Pentylbenzylbromide — Trans - 11 - pentylbenzyl 1,4,4a,5,6,11b - hexahydro - 11H - benzo[a]carbazol - 5 - one, thiosemicarbazone.

EXAMPLES IV AND V

The following procedure may be used to determine activity of the compounds of the invention against Influenza NWS and Herpes simplex viruses. The hosts may be any standard experimental animals, such as mice, ferrets and rabbits, and the like, but mice are the preferred test subjects, and the test procedures described here are in regard to the use of mice as hosts. For Influenza NWS virus infections mice weighing 14 to 15 grams are used and for Herpes simplex virus mice weighing 10 to 12 grams are used. Prior to use all of the seed virus pools are titrated for infectivity, and the challenge dose used is one which will kill almost all of the non-treated control animals ($LD_{100}$).

| Starting material | Product |
| --- | --- |
| A ____ trans-1,4,4a,5,6,11b-hexahydro-8,9-dimethoxy-11H-benzo[a]carbazol-5-one. | trans-1,4,4a,5,6,11b-hexahydro-8,9-dimethozy-11H-benzo[a]-carbazol-5-one, thiosemicarbazone. |
| B ____ trans-1,4,4a,5,6,11b-hexahydro-8-pentoxy-11H-benzo-[a]carbazol-5-one. | trans-1,4,4a,5,6,11b-hexahydro-8-pentoxy-11H-benzo[a]carbazol-5-one. thiosemicarbazone. |
| C ____ trans-1,4,4a,5,6,11b-hexahydro-9-pentoxy-11H-benzo-[a]carbazol-5-one. | trans-1,4,,4a5,6,11b-hexahydro-9-pentoxy-11H-benzo[a]carbazol-5-one. thiosemicarbazone. |
| D ____ trans-2,3-epoxy-1,4,4a,5,6,11b-hexahydro-11H-benzo-[a]carbazol-5-one. | trans-2,3-epoxy-1,4,4a,5,6,11b-hexahydro-11H-benzo[a]carbazol-5-one, thiosemicarbazone. |
| E ____ trans-1,4,4a,5,6,11b-hexahydro-8,9-methylenedioxy-11H-benzo[a]carbazol-5-one. | trans-1,4,4a,5,6,11b-hexahydro-8,9-methylenedioxy-11H-benzo-[a]carbazol-5-one, thiosemi-carbazone. |

EXAMPLE II

The procedure of Example I is repeated substituting 4-(1-adamantanyl)-3 - thiosemicarbazide for thiosemicarbazide. The product is trans-1,4,4a,5,6,11b-hexahydro-11H-benzo[a]-carbazol-5-one, 4-(1-adamantanyl) - 3-thiosemicarbazone.

EXAMPLE III

This example illustrates the preparation of trans-11-ethyl - 1,4,4a,5,6,11b-hexahydro-11H-benzo[a]carbazol-5-one, thiosemicarbazone.

Influenza NWS virus is inoculated intra-nasally into mice under light ether anesthesia, while Herpes simplex is inoculated intra-peritoneally. The soluble compounds to be tested are dissolved in an isotonic solution while the insoluble compounds to be tested are ground, then suspended in 0.5 percent carboxymethylcellulose (CMC) or the like.

The test compounds are then administered at various dose levels depending upon the activity of the compound, each dose level being orally administered to each of a group of ten mice. Two control groups of ten mice each are not treated with the test compound. Treatment may be started as early as 24 hours before infection or delayed until after infection, and the best dosage schedule used is determined for each compound. The observation period for mice infected with Influenza NWS virus is 21 days and that for mice infected with Herpes simplex virus is 14 days.

The parameters used for evaluating the effectiveness of the test compounds are percentage of survivors and geometric mean survival time. When there are no survivors among the control animals, a Rank T test is employed. The Rank T test compares the pattern of deaths among the treated hosts with the pattern of deaths among the control animals. It is a measure of the prolongation of life produced by the compound being tested.

The scores for the treated animals are compared statistically with the scores of the control group. The accepted standard of $P<0.05$ is required for significance.

Details of the challenge of Herpes simplex and Influenza NWS viruses in mice by the compounds of this invention are shown in Table I. The results of the challenge are shown in Table II.

milk, sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of suspensions or solutions which may contain coloring and flavoring agents. The solutions may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally,

TABLE I

| Example | Compound | Virus | Treatment (mg./mouse) | | Total, mg. | Number of hosts |
|---|---|---|---|---|---|---|
| | | | Pre-infection | Post-infection | | |
| IVA | Trans-1,4,4a,5,6,11b-hexahydro-11H-benzo-[a]carbazol-5-one, thiosemicarbazone | Influenza NWS | [1] 0.0334 | [2] 0.0334 | 0.1 | 10 mice. |
| IVB | | | [1] 0.1 | [2] 0.1 | 0.3 | Do. |
| IVC | | | [3] | [3] | [3] | Do. |
| IVD | | | [3] | [3] | [3] | Do. |
| VA | Trans-1,4,4a,5,6,11b-hexahydro-11H-benzo-[a]carbazol-5-one, thiosemicarbazone | Herpes Simplex | [4] 0.0002 | [5] 0.0002 | 0.0004 | Do. |
| VB | | | [4] 0.2 | [5] 0.2 | 0.4 | Do. |
| VC | | | [3] | [3] | [3] | Do. |
| VD | | | [3] | [3] | [3] | Do. |

[1] 24 hrs. and 3 hrs. before infection.
[2] 3 hrs. after infection.
[3] None.
[4] 19 hrs. before infection.
[5] 4 hrs. after infection.

TABLE II.—RESULTS OF CHALLENGE IN TABLE I

| Example | Deaths on Day | | | | | | | | Survivors | GMST |
|---|---|---|---|---|---|---|---|---|---|---|
| | 4 | 5 | 6 | 7 | 8 | 9 | 10 | 11 | | |
| IVA | 4 | 1 | 2 | 1 | 0 | 0 | 0 | 0 | 2 | $P<0.05$. |
| IVB | 0 | 3 | 2 | 2 | 1 | 0 | 0 | 0 | 2 | $P<0.05$. |
| IVC | 0 | 6 | 2 | 2 | 0 | 0 | 0 | 0 | 0 | Control. |
| IVD | 0 | 7 | 3 | 0 | 0 | 0 | 0 | 0 | 0 | Do. |
| VA | 0 | 0 | 2 | 5 | 1 | 0 | 0 | 0 | 2 | $P<0.05$. |
| VB | 0 | 0 | 1 | 5 | 2 | 0 | 0 | 1 | 1 | $P<0.05$. |
| VC | 0 | 0 | 2 | 4 | 2 | 2 | 0 | 0 | 0 | Control. |
| VD | 0 | 1 | 1 | 4 | 3 | 1 | 0 | 0 | 0 | Do. |

The absence of a dose response relationship is a characteristic of certain antiviral agents. Any response at any dosage is a positive indication of antiviral activity of the compound utilized. The reason for the absence of a dose response is uncertain. Without wishing to be bound by a theory of operation it is believed that the response may be due either to the fact that a minimum dose triggers an unknown host response mechanism or that only a minute amount of the test compound goes into solution regardless of the amount of insoluble compound in the dose.

It has been found that the physical form of the test compound is important. Best results are obtained by micronization, that is, by grinding the test compound to a maximum particle size of less than five microns ($5\mu$).

An effective dose range against Herpes simplex virus has been found to be 0.0004 to 0.4 milligram in mice weighing 10 to 12 grams. An effective dose range against Influenza NWS virus has been found to be 0.1 to 0.3 mg. in mice weighing 14 to 15 grams.

When the compounds of this invention are employed as described above, they may be administered alone or in combination with pharmaceutically acceptable carriers, the proportion of which is determined by the solubility and chemical nature of compound, chosen route of administration and standard pharmaceutical practice. For example, they may be administered orally in the form of tablets or capsules containing such excipients as starch, larger quantities of the active agent will be required to produce the same effect as a smaller quantity given parenterally. In general, the compounds of this invention are most desirably administered at a concentration level that will generally afford effective results without causing any harmful or deleterious side effects.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:
1. A compound having the formula

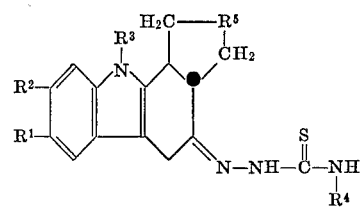

where:
R[1] and R[2] when taken separately are the same or different members selected from the class consisting of hydrogen, lower alkyl and lower alkoxy, and, when taken together are —O—CH$_2$—O—;
R[3] is a member selected from the class consisting of hydrogen, methyl, ethyl, benzyl, and p-(lower)alkylbenzyl;
R[4] is a member selected from the class consisting of hydrogen and adamantyl; and
R[5] is a member selected from the class consisting of vinylene, ethylene and epoxyethylene.

2. A compound as described in claim 1 which is trans-1,4,4a,5,6,11b - hexahydro-11H-benzo[a]carbazol-5-one, thiosemicarbazone.

3. A compound as described in claim 1 which is trans-1,4,4a,5,6,11b - hexahydro-8,9-dimethoxy-11H-benzo[a]carbazol-5-one, thiosemicarbazone.

4. A compound as described in claim 1 which is trans-1,4,4a,5,6,11b - hexahydro-8-pentoxy-11H-benzo[a]carbazol-5-one, thiosemicarbazone.

5. A compound as described in claim 1 which is trans-1,4,4a,5,6,11b - hexahydro-9-pentoxy-11H-benzo[a]carbazol-5-one, thiosemicarbazone.

6. A compound as described in claim 1 which is trans-2,3-epoxy - 1,4,4a,5,6,11b-hexahydro-11H-benzo[a]carbazol-5-one, thiosemicarbazone .

7. A compound as described in claim 1 which is trans-1,4,4a,5,6,11b - hexahydro-8,9-methylenedioxy-11H-benzo[a]carbazol-5-one, thiosemicarbazone.

8. A compound as described in claim 1 which is trans-1,4,4a,5,6,11b - hexahydro-11H-benzo[a]carbazol-5-one, 4-(1-adamantanyl)-3-thiosemicarbazone.

9. A compound as described in claim 1 which is trans-11-benzyl - 1,4,4a,5,6,11b - hexahydro-11H-benzo[a]carbazol-5-one, thiosemicarbazone.

10. A compound as described in claim 1 which is trans - 1,4,4a,5,6,11b - hexahydro-11-p-methylbenzyl-11H-benzo[a]carbazol-5-one, thiosemicarbazone.

11. A compound as described in claim 1 which is trans - 11-p-pentylbenzyl-1,4,4a,5,6,11b - hexahydro-11H-benzo[a]carbazol-5-one, thiosemicarbazone.

References Cited

UNITED STATES PATENTS 3,274,188   9/1966   Sallay _____ 260—315

HENRY R. JILES, Primary Examiner

S. D. WINTERS, Assistant Examiner

U.S. Cl. X.R.

424—274